US008560188B2

(12) United States Patent
Ishikawa et al.

(10) Patent No.: US 8,560,188 B2
(45) Date of Patent: Oct. 15, 2013

(54) CONTROL APPARATUS FOR VEHICLE AUTOMATIC TRANSMISSION (71) Applicant: Honda Motor Co., Ltd., Tokyo (JP)

(72) Inventors: Yutaka Ishikawa, Wako (JP); Hiroshi Saito, Wako (JP); Yasuhiro Gokan, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/732,649

(22) Filed: Jan. 2, 2013

(65) Prior Publication Data
US 2013/0179044 A1 Jul. 11, 2013

(30) Foreign Application Priority Data

Jan. 10, 2012 (JP) ................................. 2012-002626

(51) Int. Cl.
*G06F 19/00* (2011.01)
(52) U.S. Cl.
USPC ................. 701/53; 701/51; 701/55; 701/56; 701/61; 477/34; 477/46; 477/56; 477/59; 477/61; 192/3.29; 192/3.33; 74/335; 74/473.21
(58) Field of Classification Search
USPC ................. 701/51, 52, 55, 56, 61, 62, 64, 65; 477/34, 46, 56, 59, 61, 63, 68, 78, 80, 477/81, 97, 111, 107, 108, 118, 120, 125, 477/131, 143, 144, 148, 152, 154, 155, 477/906; 192/3.29, 3.33; 74/335, 473.21
See application file for complete search history.

(56) References Cited

U.S. PATENT DOCUMENTS

| 4,823,643 | A | * | 4/1989 | Koshizawa | 477/78 |
| 4,955,257 | A | * | 9/1990 | Terayama et al. | 477/154 |
| 4,977,797 | A | * | 12/1990 | Aoki et al. | 477/129 |
| 5,012,699 | A | * | 5/1991 | Aoki et al. | 477/148 |
| 5,545,108 | A | * | 8/1996 | Wagner et al. | 477/125 |
| 6,070,118 | A | * | 5/2000 | Ohta et al. | 701/65 |
| 6,740,005 | B2 | * | 5/2004 | Watanabe et al. | 477/110 |

(Continued)

FOREIGN PATENT DOCUMENTS

| JP | 2862538 | 12/1998 |
| JP | 2959938 | 7/1999 |

OTHER PUBLICATIONS

Liao et al., Modeling and Simulation of the Shift Process for Wet-Type Dual Clutch Transmission, 2010, IEEE, p. 1-4.*

(Continued)

*Primary Examiner* — McDieunel Marc
(74) *Attorney, Agent, or Firm* — Arent Fox LLP (57) ABSTRACT

A sport running estimated value LEVELSP obtained by searching a value on a map prepared in advance based on an average values AGYAVE of lateral accelerations GY of a vehicle and on average values of vehicle speed changes is calculated, and a vehicle speed on a shift map is searched based on the sport running estimated value LEVELSP and an estimated value DA of a vehicle gradient, whereby a downshift vehicle speed VA at which a downshift is implemented is calculated. Then, the downshift is implemented in a case where actuation of a brake is detected, deceleration of the vehicle is a predetermined value or more, and a current vehicle speed is a downshift vehicle speed VA or more. In such a way, running on a meandering road, for which the downshift and a subsequent shift hold should be implemented, is sensed appropriately.

8 Claims, 10 Drawing Sheets

(56) References Cited

U.S. PATENT DOCUMENTS

| | | | |
|---|---|---|---|
| 7,074,158 B2* | 7/2006 | Watanabe et al. | 477/159 |
| 7,505,842 B2* | 3/2009 | Luh | 701/55 |
| 7,824,307 B2* | 11/2010 | Matsubara et al. | 477/5 |
| 8,021,268 B2* | 9/2011 | Sawada | 477/118 |
| 8,311,711 B2* | 11/2012 | Tsutsumi et al. | 701/52 |
| 2003/0027685 A1* | 2/2003 | Watanabe et al. | 477/107 |
| 2004/0192484 A1* | 9/2004 | Watanabe et al. | 475/116 |
| 2006/0015234 A1* | 1/2006 | Luh | 701/51 |
| 2008/0318727 A1* | 12/2008 | Matsubara et al. | 477/3 |
| 2009/0088293 A1* | 4/2009 | Sawada | 477/92 |
| 2010/0174458 A1* | 7/2010 | Tsutsumi et al. | 701/52 |
| 2011/0196590 A1* | 8/2011 | Ayabe et al. | 701/68 |
| 2012/0253618 A1* | 10/2012 | Takada et al. | 701/55 |

OTHER PUBLICATIONS

Kim et al, A distributed control system for an automatic mechanical transmission of a fuel cell city bus, 1997, IEEE, p. 759-764.*

* cited by examiner

CONTROL APPARATUS FOR VEHICLE AUTOMATIC TRANSMISSION

REFERENCE TO RELATED APPLICATIONS

This disclosure relates to a theme included in Japanese Patent Application No. 2012-002626 filed on Jan. 10, 2012, and a whole of a disclosure thereof is explicitly incorporated by reference in this application.

BACKGROUND OF THE INVENTION

1. Technical Field of the Invention

The present invention relates to a control apparatus for a vehicle automatic transmission, and particularly, relates to a control apparatus for a vehicle automatic transmission, which performs an automatic downshift for speed gears according to needs at the time of implementing a manual shift mode of performing a shift operation instructed by a manual operation of a driver.

2. Description of the Related Art

As a control apparatus for a vehicle automatic transmission, an apparatus is general, which prepares in advance plural type of shift maps for obtaining shift characteristics, obtains a value indicating a running resistance through acceleration, determines whether or not a vehicle is present on a flat road, an uphill road or a downhill road, selects any of the shift maps, and controls a gear ratio based on the selected shift map. That is to say, the control apparatus compares expected acceleration to be preset based on an engine output and actual acceleration to be actually obtained with each other, determines an uphill/downhill degree (road gradient), selects an optimum shift map, and decides the gear ratio based on the selected shift map.

As the control device as described above, in Japanese Patent No. 2959938 (Patent Literature 1), a control device for a vehicle automatic transmission is disclosed, in which a forcible downshift when the vehicle runs on the downhill road is made less likely to occur as the road gradient is becoming steeper as long as a deceleration intention of a driver is not strong, and enhancement of drivability is achieved.

Moreover, in Japanese Patent No. 2862538 (Patent Literature 2), a control device for a vehicle automatic transmission is disclosed, in which, when it is detected that a running road is a road (downhill road) with a predetermined down gradient or more, a brake actuation is detected, and predetermined vehicle deceleration or more is detected, then a shift line at the time of a low load is changed to shift characteristics set on a higher vehicle speed side in comparison with usual shift characteristics, whereby a violent shift caused by an accelerator operation is prevented.

As described above, the early downshift at the time of the conventional vehicle deceleration has been implemented on the downhill road, and a necessary engine brake has been ensured by the downshift concerned. Moreover, also on places other than the downhill road, the early downshift has been implemented in response to the vehicle deceleration; however, the downshift concerned has been implemented only at the time of sudden deceleration of the vehicle. Furthermore, it has been determined that an opening degree of an accelerator pedal and the vehicle acceleration are predetermined values or more, and an upshift after the downshift has been implemented based on such a determination concerned.

However, if the downshift on the places other than the downhill road is implemented only at the time of the sudden deceleration of the vehicle as described above, then it is apprehended that, at timing when the downshift and a shift hold after the downshift should be originally performed in such an event where the vehicle runs on a continuously meandering road (winding road), appropriate downshift and shift hold may not be performed, and good drivability may not be able to be ensured.

Moreover, if the determination of the downshift and the subsequent shift hold is made based on a variation of the opening degree of the accelerator pedal, then it is apprehended that, in a drive of a driver whose operation of the accelerator pedal is violent (rough), the downshift and the shift hold may be implemented at timing when the downshift and the shift hold are unnecessary. Moreover, in a drive of a driver highly skilled in driving, whose operation of the accelerator pedal is gentle, it is apprehended that the downshift and the subsequent shift hold may not be implemented at timing when the downshift and the shift hold are originally necessary. That is to say, there is a disadvantage that the timing of the downshift and the shift hold is undesirably decided only by an operation manner of the driver irrespective of a running environment such as type of a road surface on which the vehicle runs.

Moreover, as the control apparatus for a vehicle automatic transmission, which is as described above, there is an apparatus capable of implementing a normal running mode and a sport running mode in a switching manner. Here, the normal running mode is a running mode of performing shift control that is based on a normal shift map mainly for a driver who has a general skill, and the sport running mode is a running mode of performing shift control that is based on a shift mode for sport running, which has setting that makes much of running performance (running feeling, acceleration feeling and the like) in order to satisfy tastes of a driver who has a high skill. Then, in this type of the control apparatus, it is necessary to perform the downshift early (on a high vehicle-speed side) at the time of deceleration in order to ensure responsiveness at the time of re-acceleration in the sport running mode. Meanwhile, if the downshift is implemented early in the normal running mode, then an increase of the number of engine revolutions is brought about, and it is apprehended that the increase concerned may result in feeling of wrongness about drivability, such as worsening of vibrations/noise of the vehicle, and an increase of the engine brake.

SUMMARY OF THE INVENTION

The present invention has been made in consideration of the above-mentioned point, and it is an object of the present invention to provide a control apparatus for a vehicle automatic transmission, which makes it possible to implement the downshift and the shift hold at appropriate timing corresponding to the running environment of the vehicle, and thereby enables the good drivability to be ensured.

The present invention for solving the above-described problem is a control apparatus for a vehicle automatic transmission, which performs upshift and downshift control for speed gears in accordance with a shift map including upshift and downshift lines set for each of the speed gears, the control apparatus including: shift mode switching means (10) for executing, in a switching manner, an automatic shift mode of automatically performing a shift operation by determining a speed gear, which is to be set, based on a running state of a vehicle, and a manual shift mode of performing a shift operation instructed by a manual operation of a driver; downshift determining means (10) for performing a determination as to whether or not to implement an automatic downshift of the speed gear in the manual shift mode; brake detecting means (24) for detecting an actuation of a brake; deceleration calculating means (10) for calculating deceleration of the vehicle; vehicle speed detecting means (S1 to S4, 10) for detecting a vehicle speed; running state estimated value calculating means (10) for calculating a running state estimated value (LEVELSP) obtained by searching a value on a map prepared in advance based on an average value (|ΔH|AVE) of amounts of accelerator pedal operations by the driver and on an average value (|ΔV|AVE) of changes of the vehicle speed; and downshift vehicle speed calculating means (10) for calculating a downshift vehicle speed (VA) by searching a vehicle speed on the shift map based on the running state estimated value (LEVELSP) and on an estimated value (DA) of a vehicle gradient, wherein the downshift determining means (10) determines implementation of the downshift in a case where the actuation of the brake is detected by the brake detecting means (24), in a case where the deceleration (ΔV) of the vehicle, which is calculated by the deceleration calculating means (10), is a predetermined value (ΔV1) or more, and in a case where a current vehicle speed (V) detected by the vehicle speed detecting means (S1 to S4, 10) is the downshift vehicle speed (VA) or more.

In accordance with the control apparatus for a vehicle automatic transmission according to the present invention, the running state estimated value (sport running estimated value in this embodiment) is calculated, which is obtained by searching the value on the map prepared in advance based on the average values of the amounts of the accelerator pedal operations by the driver and on the average values of the changes of the vehicle speed, and then the vehicle speed on the shift map is searched based on the running state estimated value concerned and an estimated value of a vehicle gradient, whereby the downshift speed at which the downshift is implemented is calculated. That is to say, in the event of calculating the downshift vehicle speed, the vehicle speed on the shift map is searched based on the running state estimated value in addition to the estimated value of the vehicle gradient, whereby it is made possible to implement an early (that is, at a higher vehicle speed) downshift also on a flat road, and moreover, it is made possible to implement the early downshift also at the time other than the time of sudden deceleration. Hence, the downshift can be implemented at appropriate timing matched with a request of the driver for vehicle maneuverability. In such a way, it becomes possible to ensure the good drivability.

Moreover, a control apparatus for a vehicle automatic transmission according to the present invention is a control apparatus for a vehicle automatic transmission, which performs upshift and downshift control for speed gears in accordance with a shift map including upshift and downshift lines set for each of the speed gears, the control apparatus including: shift mode switching means (10) for executing, in a switching manner, an automatic shift mode of automatically performing a shift operation by determining a speed gear, which is to be set, based on a running state of a vehicle, and a manual shift mode of performing a shift operation instructed by a manual operation of a driver; downshift determining means (10) for performing a determination as to whether or not to implement an automatic downshift of the speed gear in the manual shift mode; brake detecting means (24) for detecting an actuation of a brake; deceleration calculating means (10) for calculating deceleration of the vehicle; vehicle speed detecting means (S1 to S4, 10) for detecting a vehicle speed; running state estimated value calculating means (10) for calculating a running state estimated value (LEVELSP) obtained by searching a value on a map prepared in advance based on an average value (AGYAVE) of lateral accelerations of the vehicle and on an average value (|ΔV|AVE) of changes of the vehicle speed; and downshift vehicle speed calculating means (10) for calculating a downshift vehicle speed (VA), at which the downshift is implemented, by searching a vehicle speed on the shift map based on the running state estimated value (LEVELSP) and on an estimated value (DA) of a vehicle gradient, wherein the downshift determining means (10) determines implementation of the downshift in a case where the actuation of the brake is detected by the brake detecting means (24), in a case where the deceleration (ΔV) of the vehicle, which is calculated by the deceleration calculating means (10), is a predetermined value (ΔV1) or more, and in a case where a current vehicle speed (V) detected by the vehicle speed detecting means (S1 to S4, 10) is the downshift vehicle speed (VA) or more.

In accordance with this control apparatus for a vehicle automatic transmission, the running state estimated value is calculated, which is obtained by searching the value on the map prepared in advance based on the average values of the lateral accelerations of the vehicle and on the average values of the changes of the vehicle speed, and then the vehicle speed on the shift map is searched based on the running state estimated value concerned and an estimated value of a vehicle gradient, whereby the downshift speed at which the downshift is implemented is calculated. That is to say, in the event of calculating the downshift vehicle speed, the vehicle speed on the shift map is searched based on the running state estimated value, which is calculated based on the average values of the lateral accelerations of the vehicle and on the average values of the changes of the vehicle speed, in addition to the estimated value of the vehicle gradient, whereby it is made possible to implement the early (that is, at a higher vehicle speed) downshift also on the flat road, and moreover, it is made possible to implement the early downshift also at the time other than the time of the sudden deceleration. Hence, the downshift can be implemented at appropriate timing matched with the request of the driver for the vehicle maneuverability. In such a way, it becomes possible to ensure good drivability.

Moreover, the sport running estimated value is calculated without using the average values of the accelerator pedal opening degree changes. In such a way, even in the case where the violent accelerator pedal operation (throttle operation) by the driver is made, an apprehension that the downshift may occur thereby at inappropriate timing is eliminated. Moreover, even in drive by a driver highly skilled in driving, whose accelerator pedal operation (throttle operation) is gentle, in the case where the vehicle runs on a meandering road (winding road), the downshift can be generated at appropriate timing.

That is to say, the downshift vehicle speed is decided based on the running state estimated value calculated based on the average values of the lateral accelerations of the vehicle and on the average values of the changes of the vehicle speed, and accordingly, the downshift comes to occur at appropriate timing corresponding to such a running environment in the case where the vehicle runs on the meandering road. Hence, it becomes possible to ensure the good drivability.

Moreover, the above-described control apparatus for a vehicle automatic transmission may further include: shift hold determining means (10) for performing a determination as to whether or not to hold a current shift gear, wherein the shift hold determining means (10) may perform a shift hold determination as to whether or not to hold the current shift gear after the implementation of the downshift, and the shift hold determination may be a determination that is based on whether or not an average value (AGYAVE) of the lateral accelerations of the vehicle is a predetermined value or more.

With this configuration, the shift hold determination is performed based on whether or not the average value of the lateral accelerations of the vehicle is the predetermined value or more, whereby it becomes possible to implement the shift hold at appropriate timing corresponding to a state of the road surface on which the vehicle runs. That is to say, after the implementation of the downshift, the average value of the lateral accelerations of the vehicle is inserted into determination conditions for holding the current shift gear, whereby an unnecessary upshift can be suppressed, and it is made possible to ensure the responsiveness (acceleration responsiveness of the vehicle) at the time of re-acceleration.

Moreover, the above-described control apparatus for a vehicle automatic transmission may further include: running mode switching means (10) for executing, in a switching manner, a normal running mode of performing shift control that is based on a normal shift map, and a sport running mode of performing shift control that is based on a shift map for sport running, wherein the downshift by the downshift determining means and the shift hold by the shift hold determining means may be performed at a time when the sport running mode is implemented.

With this configuration, the early (on a high vehicle-speed side) downshift is enabled in the sport running mode, whereby the responsiveness of the vehicle at the time of the re-acceleration can be ensured. Meanwhile, the early downshift and shift hold are implemented in the sport running mode, whereby the early downshift and shift hold can be prevented from being implemented in the normal running mode, and accordingly, it is made possible to suppress an increase of the number of engine revolutions, vibrations/noise of the vehicle and an increase of engine brakes in the normal running mode.

Note that the above-described reference numerals in the parentheses are reference numerals of constituents in embodiments to be described later, which are shown as an example of the present invention.

In accordance with the control apparatus for a vehicle automatic transmission according to the present invention, the running on the meandering road (winding road), for which the downshift and the shift hold after the downshift concerned should be implemented, is appropriately sensed, whereby the downshift and the shift hold can be implemented at more appropriate timing.

DETAILED DESCRIPTION OF THE INVENTION

A description is made below in detail of embodiments of the present invention with reference to the accompanying drawings.

[First Embodiment]

Figure 1:
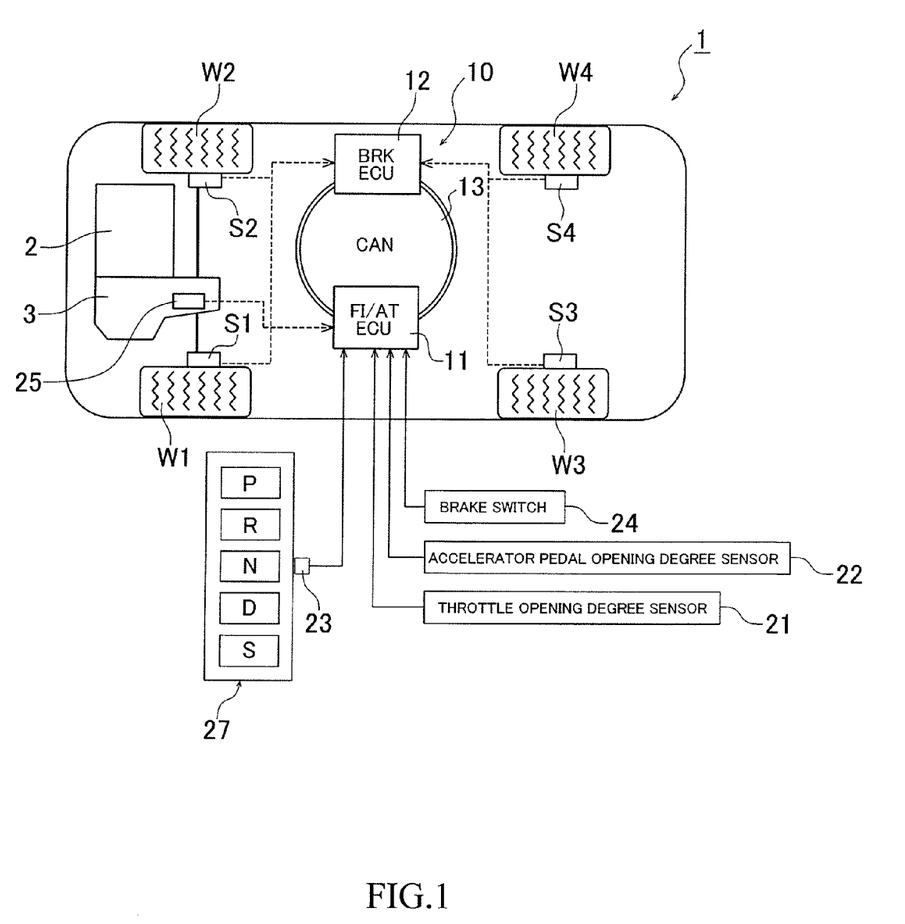
FIG. 1 is a view showing a schematic configuration example of a vehicle including a control apparatus for an automatic transmission according to an embodiment of the present invention.

FIG. 1 is a view showing a schematic configuration of a vehicle including a control apparatus for a vehicle automatic transmission according to an embodiment of the present invention. A vehicle 1 shown in FIG. 1 includes: an engine 2; and an automatic transmission 3 having a multi-speed transmission gear mechanism, and an output of the engine 2 is transmitted through the automatic transmission 3 to driving wheels (front wheels) W1 and W2. Moreover, the vehicle 1 includes a control unit (ECU) 10 using a microcomputer for performing drive control for the vehicle 1. The control unit 10 includes: an FI/AT ECU 11 for performing control for the engine 2 and the automatic transmission 3; and a brake ECU (or VSA ECU) 12 for performing behavior control for the vehicle, which includes control for a brake. Then, these FI/AT ECU 11 and brake ECU 12 are connected to each other through a CAN (controller area network) 13.

To the control unit 10, there are inputted signals coming from a throttle opening degree sensor 21, an accelerator pedal opening degree sensor 22, a shift position sensor 23 and a brake switch 24. The throttle opening degree sensor 21 is a sensor that detects an opening degree of a throttle valve, and the accelerator pedal opening degree sensor 22 is a sensor that detects an accelerator pedal opening degree. The shift position sensor 23 is a sensor that detects a current shift position (speed gear) 27 of the automatic transmission 3. The brake switch 24 is a switch that detects an actuation of the brake. Meanwhile, from the control unit 10, a signal for the transmission control is outputted to the automatic transmission 3.

Moreover, in the vehicle 1, wheel speed sensors Si to S4, which detect wheel speeds of the respective left, right, front and rear wheels W1 to W4, are placed. Furthermore, a rotation sensor 25 that detects the number of rotations (rotation pulses) of a countershaft (not shown) of the automatic transmission 3 is placed. Detected values (wheel speed pulses) of the wheel speed sensors S1 to S4 are inputted to the brake ECU 12. Detected values of the rotation sensor 25 are inputted to the FI/AT ECU 11.

Reference numeral 27 denotes a shift position of a shift lever. Reference symbol P denotes parking range, reference symbol R denotes a reverse range, and reference symbol N denotes a neutral range. Reference symbol D denotes a drive range, and when the shift lever is located in the D range, an automatic shift mode is brought, in which a shift operation is performed by determining a speed gear or a shift ratio, which should be decided, based on a running state. Reference symbol S denotes a sport range, which enables running by a sport mode in the automatic transmission 3. In the control apparatus of this embodiment, in addition to a normal mode (normal running mode) as a shift mode mainly for a driver who has a general skill, a sport running mode as setting that makes much of running performance (running feeling, acceleration feeling and the like) in order to satisfy tastes of a driver who has a high skill is provided. Note that, though illustration and a detailed description are omitted, shift control that is based on a normal shift map is performed in the normal mode, and shift control that is based on a shift map for sport running is performed in the sport running mode.

Moreover, in this embodiment, as shift modes by the automatic transmission 3, an automatic shift mode and a manual shift mode are set in a switching manner. Here, the automatic shift mode is a mode of automatically performing the shift operation by determining the speed gear, which should be set, based on the running state of the vehicle, and the manual shift mode is a mode of performing a shift operation instructed by a manual operation of the driver. Control in the manual shift mode is performed by using a paddle switch provided in the vicinity of a steering wheel (not shown). Note that, in place of the above-described paddle switch, "+" and "−" positions for inputting manual shift control may be provided.

Then, in the control apparatus for an automatic transmission according to this embodiment, at the time when the sport running mode is implemented, a determination as to whether or not to implement a downshift (automatic downshift) of the speed gear is performed, and the downshift is implemented based on the determination concerned. A description is made below of an implementation procedure of this downshift determination, which is to be performed during the sport running mode, with reference to a flowchart of FIG. 2.

Figure 3A:
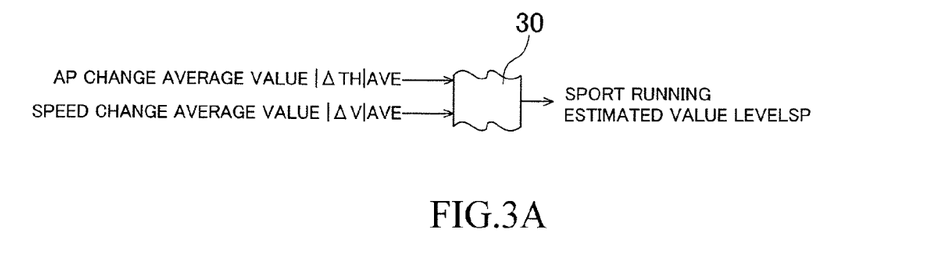
FIG. 3A is a conceptual view showing a calculation procedure of a sport running estimated value according to a first embodiment.

In the downshift determination concerned, first, a sport running estimated value (running state estimated value) LEVELSP is calculated (Step ST1-1). FIG. 3A is a conceptual view showing a calculation procedure of the sport running estimated value LEVELSP. As shown in FIG. 3A, the sport running estimated value LEVELSP is a value (dimensionless value) calculated by searching a value on a two-dimensional map 30 based on the two-dimensional map 30 concerned, the two-dimensional map 30 being composed in such a manner that an average value $|\Delta TH|AVE$ of accelerator pedal opening degree changes (or throttle opening degree changes) $\Delta TH$ detected by the accelerator pedal opening degree sensor 22 (or the throttle opening degree sensor 21) is taken on an axis of ordinates or an axis of abscissas, and that an average value $|\Delta V|AVE$ of changes of a vehicle speed V calculated based on the detected values of the wheel speed sensors S1 to S4 is taken on the axis of abscissas or the axis of ordinates. That is to say, the sport running estimated value LEVELSP becomes a higher value as the average value $|\Delta TH|AVE$ of the accelerator pedal opening degree changes $\Delta TH$ is becoming a higher value, and becomes a higher value as the average value $|\Delta V|AVE$ of the changes of the vehicle speed V is becoming a higher value.

Figure 2:
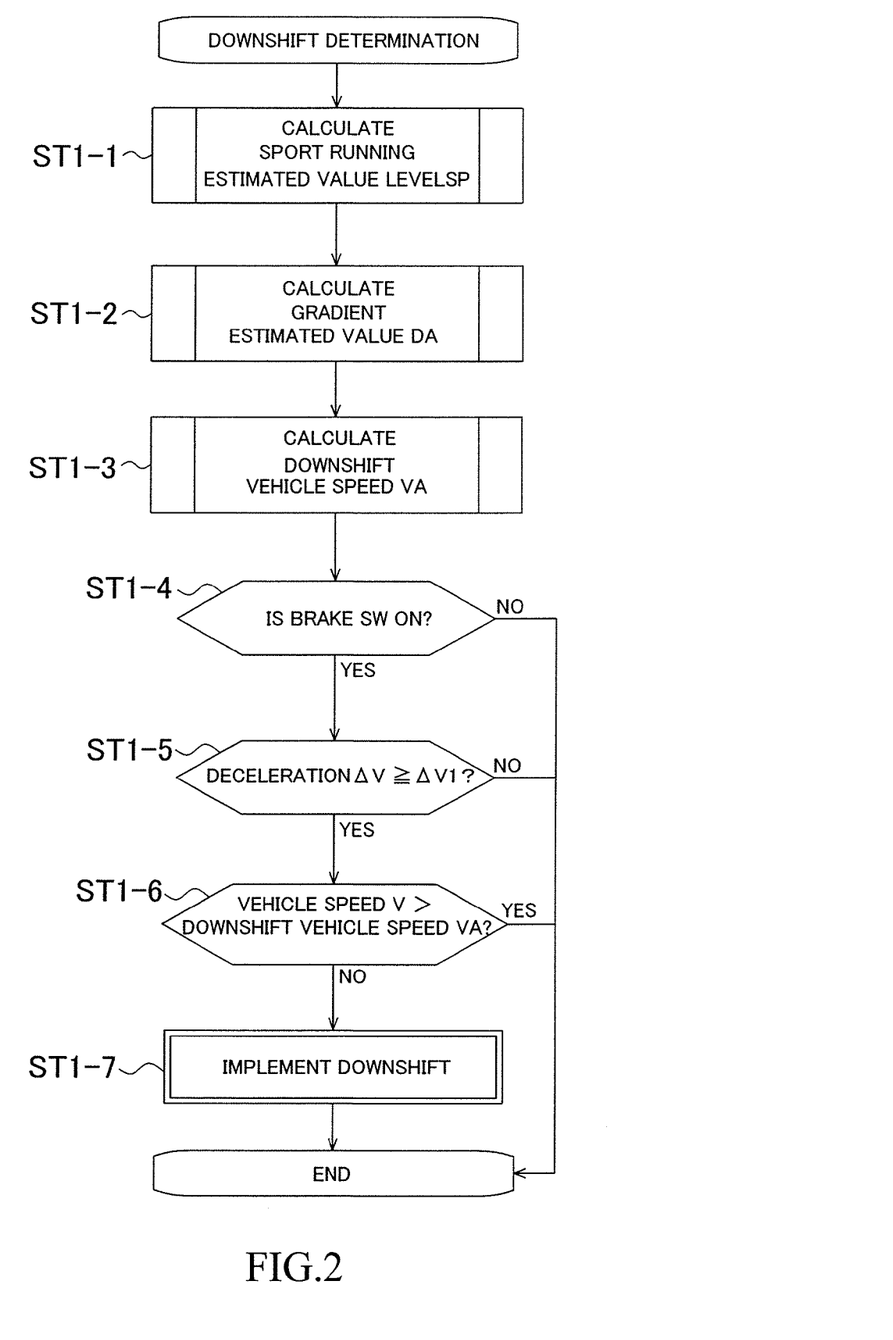
FIG. 2 is a flowchart showing an implementation procedure of a downshift determination.

Next, a gradient estimated value DA of a road surface on which the vehicle 1 is running is calculated (Step ST1-2). For this calculation, first, expected acceleration which the vehicle 1 is expected to output is calculated based on the vehicle speed V and an engine load (throttle opening degree). Subsequently, actual acceleration or deceleration is obtained from an increase degree or decrease degree of the vehicle speed V per unit time, and the estimated acceleration thus calculated and the actual acceleration are compared with each other. When the actual acceleration and the estimated acceleration coincide with each other, it is determined that the vehicle 1 is running on a flat road, when the actual acceleration exceeds the expected acceleration, it is determined that the vehicle 1 is running on a downhill road, and when the actual acceleration is smaller than the expected acceleration, it is determined that the vehicle 1 is running on an uphill road. The gradient estimated value DA is calculated by such an uphill/downhill determination that is based on the comparison between the actual acceleration and the expected acceleration.

Figure 3B:
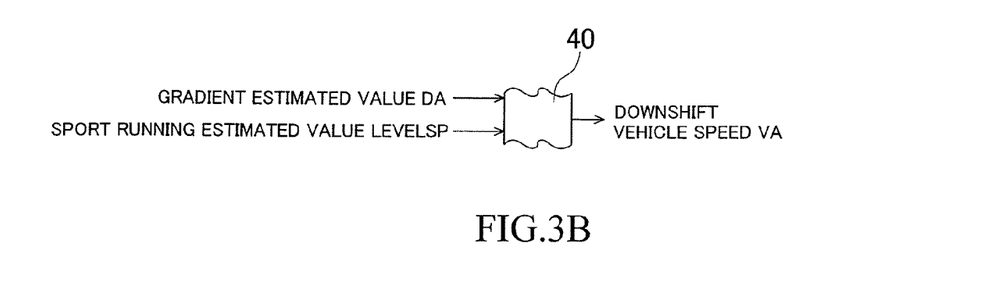
FIG. 3B is a conceptual view showing a calculation procedure of a downshift vehicle speed.
Figure 4A:
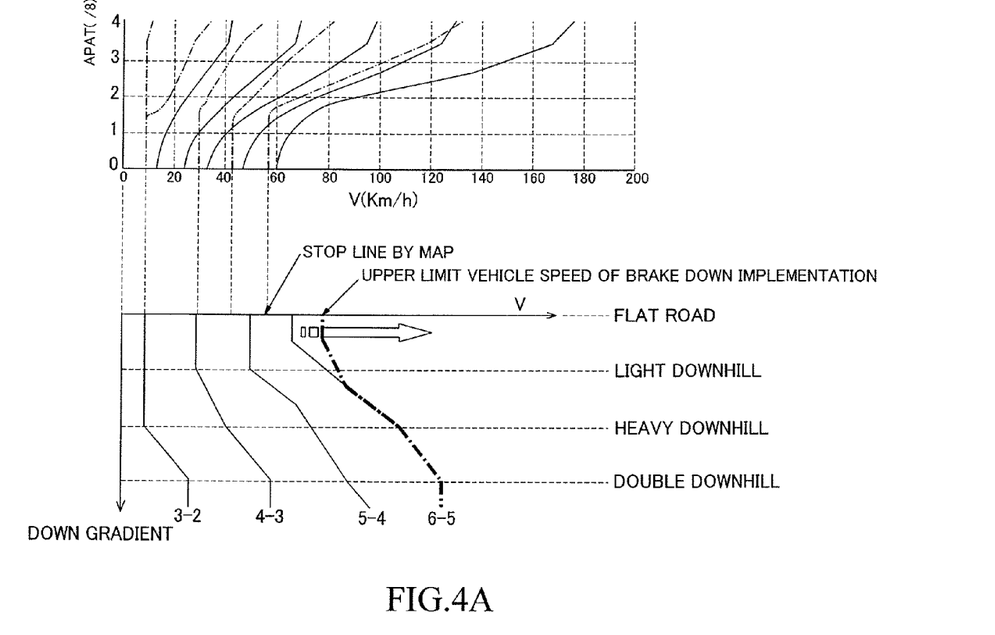
FIG. 4A is a shift map for a flat road and a deceleration shift characteristic map that is based on a down gradient and a vehicle speed.
Figure 4B:
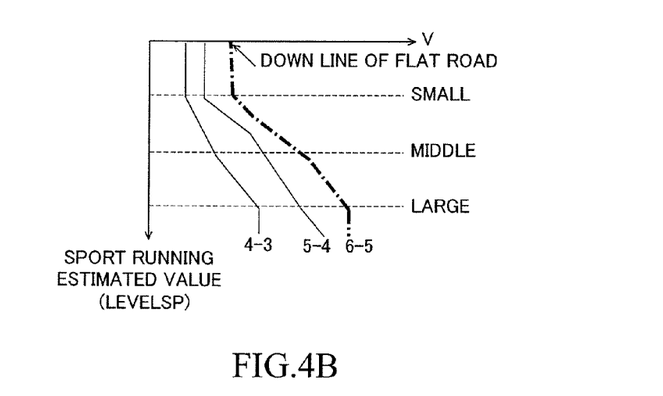
FIG. 4B is a map for performing switch for a downshift line on the deceleration shift characteristic map based on the sport running estimated value.

Next, a downshift vehicle speed VA is calculated (Step ST1-3). FIG. 3B is a conceptual view showing a calculation procedure of the downshift vehicle speed. As shown in FIG. 3B, the downshift vehicle speed VA is calculated by searching a value on a downshift vehicle speed map (shift map) 40 based on the gradient estimated value DA and the sport running estimated value LEVELSP. FIG. 4A is a chart showing an example of the downshift vehicle speed map 40 and a deceleration shift characteristic map that is based on the down gradient and the average value of the vehicle speeds V. The downshift vehicle speed map 40 is a shift map of a 6-speed automatic transmission for the flat road, solid lines on the map shown in FIG. 4A are upshift lines, and alternate long and short dashed lines on the map concerned are downshift lines. As well known, hystereses are provided between the upshift lines and the downshift lines in order to prevent shift hunting. Moreover, the deceleration shift characteristic map is a shift characteristic map that is based on the down gradient and the average value of the vehicle speeds V, in which the vehicle speed V is taken on an axis of abscissas, and the down gradient is taken on an axis of ordinates. Moreover, FIG. 4B is a map for switching the downshift lines on the deceleration shift characteristic map based on the sport running estimated value LEVELSP, in which the vehicle speed V is taken on an axis of abscissas, and the sport running estimated value LEVELSP is taken on an axis of ordinates.

As shown in the downshift vehicle speed map of FIG. 4A, the downshift vehicle speed VA at which the downshift is implemented is set so as to be, from a vehicle speed in the case where the vehicle is running on the flat road, gradually higher as an extent of the down gradient is becoming larger in order of a light downhill, a heavy downhill and a double downhill. In addition to this, in this embodiment, as shown in FIG. 4B, an axis of the sport running estimated value LEVELSP is added to the map of the downshift lines, whereby the switch of the downshift lines (downshift vehicle speeds) is performed. That is to say, the downshift line corresponding to the down gradient is switched to a downshift line added with the sport running estimated value LEVELSP. An example (6-5 downshift line) of the downshift line switched by being added with the sport running estimated value LEVELSP as described above is shown by an alternate long and short dash line on the deceleration shift characteristic map of FIG. 4A. In this downshift line, the downshift vehicle speed on the flat road is switched to a higher vehicle speed side in comparison with the downshift line (solid line) before the switch. That is to say, the sport running estimated value LEVELSP is added, whereby the downshift vehicle speed comes to be generated on the higher vehicle speed side also on the flat road irrespective of the gradient of the road surface on which the vehicle 1 runs. In such a way, the early downshift is implemented also on the flat road in response to the running state.

Returning to the flowchart of FIG. 2, subsequently, it is determined whether or not the brake switch is on (Step ST1-4). In the case where a brake pedal operation is not performed by the driver, the brake switch is left off. In this case (NO in Step ST1-4), it is regarded that there is no deceleration intention made by the driver, and the processing is directly ended without implementing the downshift. Meanwhile, in the case where the brake pedal is operated by the driver, and the brake switch is switched on, then it is regarded that there is a deceleration intention made by the driver. In this case (YES in Step ST1-4), then subsequently, it is determined that the deceleration $\Delta V$ of the vehicle 1 is a predetermined value $\Delta V1$ or more ($\Delta V \geq \Delta V1$) (Step ST1-5). If the deceleration $\Delta V$ is less than the predetermined value $\Delta V1$ (NO) as a result of this, then the processing is directly ended without implementing the downshift. Meanwhile, if the deceleration $\Delta V$ is the predetermined value $\Delta V1$ or more (YES), then subsequently, it is determined whether or not the current vehicle speed V is larger than the downshift vehicle speed VA (V>VA) (Step ST1-6). In the case where the current vehicle speed V is larger than the downshift vehicle speed VA (YES) as a result of this, then the processing is directly ended without implementing the downshift. Meanwhile, if the current vehicle speed V is the downshift vehicle speed VA or less (NO), the downshift is implemented (Step ST1-7).

Figure 5:
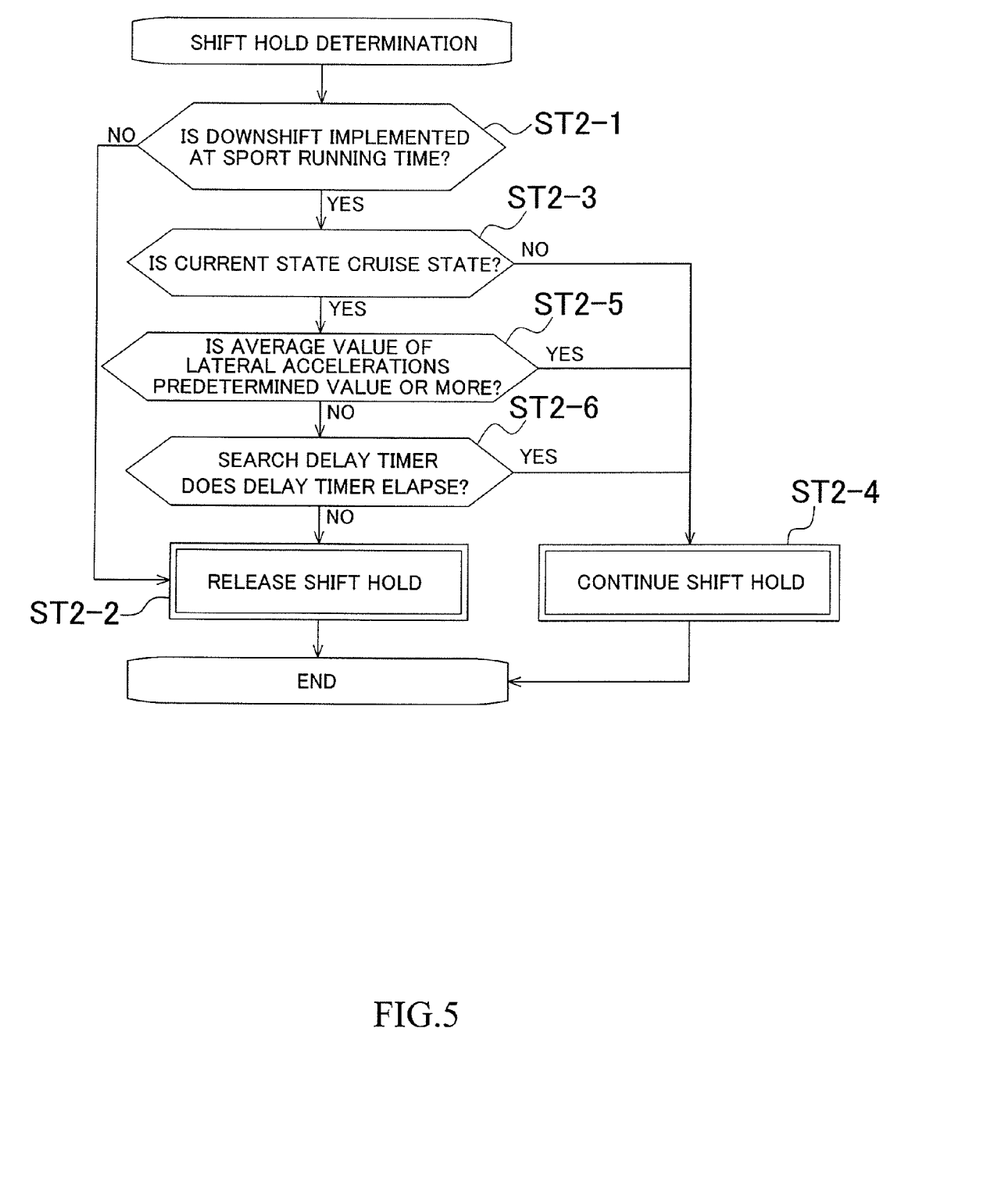
FIG. 5 is a flowchart showing an implementation procedure of a shift hold determination.

Next, a description is made of an implementation procedure of a shift hold determination after the downshift with reference to a flowchart of FIG. 5. In this shift hold determination, first, it is determined whether or not the above-described downshift (Step ST1-7) is implemented in the sport running mode (Step ST2-1). If the downshift is not implemented (NO) as a result of this, then the shift hold is released (Step ST2-2), and the processing is ended. Meanwhile, if the downshift is implemented in Step ST2-1 (YES), then subsequently, it is determined whether or not the vehicle 1 is in a cruise state (Step ST2-3). Such a determination (cruise determination) of the cruise state is performed based on an average value of operation amounts of the accelerator pedal and on an average value of the accelerations of the vehicle 1. If the vehicle 1 is not in the cruise state (NO) as a result of this, then shift hold at a shift gear after the downshift is continued (Step ST2-4), and the processing is ended. Meanwhile, if the vehicle 1 is in the cruise state (YES), then subsequently, it is determined whether or not an average value of lateral accelerations (lateral G) GY of the vehicle 1 is a predetermined value or more (Step ST2-5).

Figure 6A:
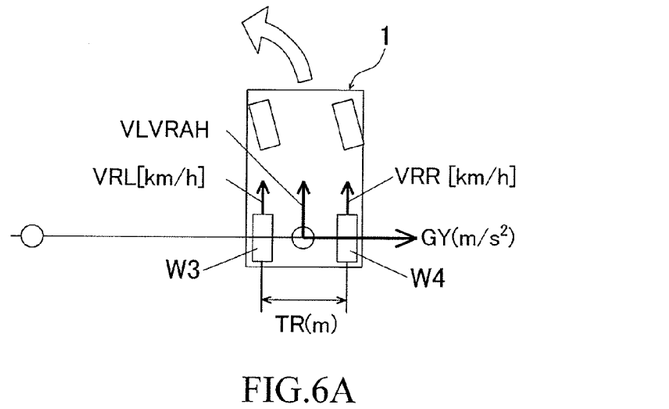
FIG. 6A is a view showing lateral acceleration to be applied to the vehicle.
Figure 6B:
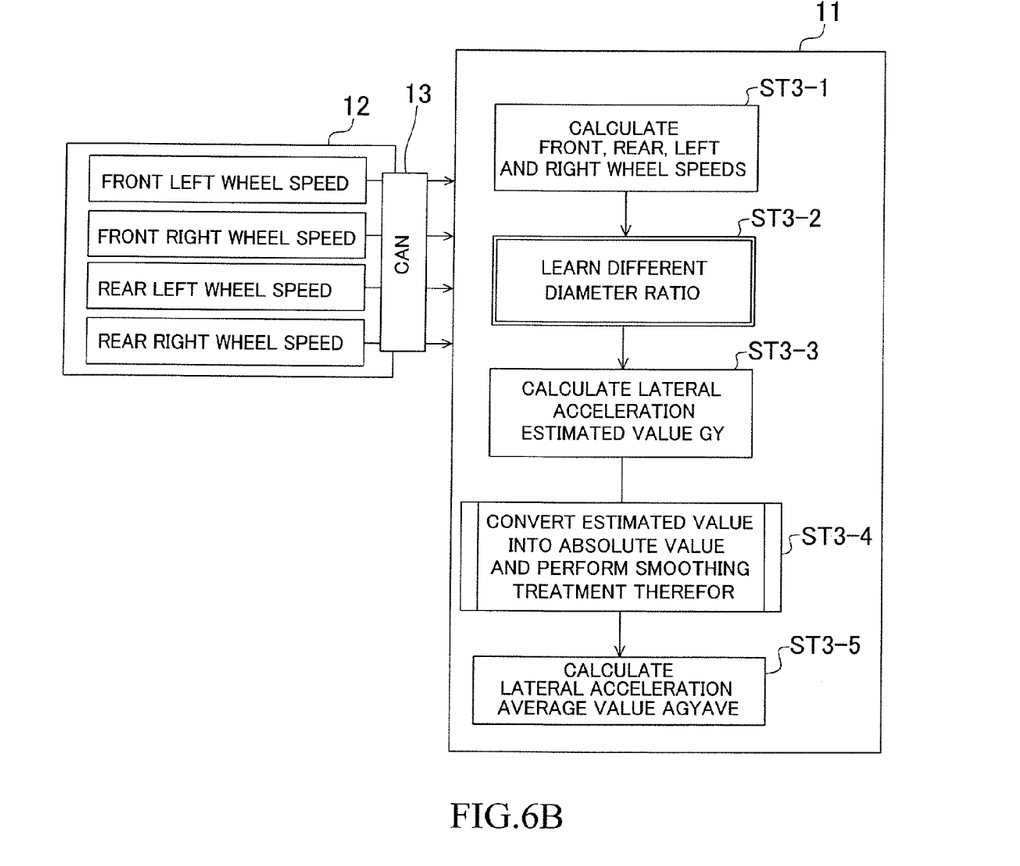
FIG. 6B is a view showing a flow of calculating the lateral acceleration.

Here, a description is made in detail of a calculation procedure of each of the lateral accelerations GY of the vehicle 1. FIG. 6A and FIG. 6B are views for explaining the calculation procedure of the lateral acceleration GY: FIG. 6A is a view showing the lateral acceleration to be applied to the vehicle 1; and FIG. 6B is a view showing a flow of calculating the lateral acceleration GY in the respective units. In the event of calculating the lateral acceleration GY, then as shown in FIG. 1, the respective wheel speeds of the front, rear, left and right wheels W1 to W4, which are detected by the respective wheel speed sensors Si to S4, are inputted from the brake ECU (VSA ECU) 12 through the CAN 13 to the FI/AT ECU 11. In the FI/AT ECU 11, the front, rear, left and right wheels are calculated based on the inputted respective wheel speeds (ST3-1). Subsequently, learning of a different diameter ratio between the left and right rear wheels W3 and W4 is performed (ST3-2). The learning of the different diameter ratio, which is mentioned here, is processing for calculating a tire different diameter ratio as a ratio of a tire diameter of the rear left wheel W3 and a tire diameter of the rear right wheel W4 in order to detect a relative variation in tire diameter between the left and right rear wheels W3 and W4, and in addition, for calculating a different diameter ratio learning value by learning the calculated tire different diameter ratio.

Then, an estimated value of the lateral acceleration GY is calculated by using the calculated different diameter ratio learning value (ST3-3). For this calculation, wheel speeds VRL and VRR are calculated by multiplying rotation speeds of the wheels, which are individually outputted by the respective wheel speed sensors S3 and S4 of the left and right rear wheels W3 and W4, by radii of the wheels W3 and W4. The estimated value of the lateral acceleration GY is calculated from the wheel speeds VRL and VRR of the rear wheels. The estimated value of the lateral acceleration GY can be obtained, for example, by the following Expression (1):

$$GY=(VRL-VRR) \times (VRL+VRR)/2 \times TR \qquad (1)$$

where TR is a tread (wheel track) between the rear wheels.

Thereafter, such estimated values of the lateral accelerations GY, which are thus calculated, are converted into absolute values, are subjected to annealing treatment, and are thereby averaged (ST3-4), and an average value AGYAVE of the lateral accelerations GY is calculated (ST3-5). The shift hold determination is performed by using the calculated average value AGYAVE of the lateral accelerations GY (ST3-6).

That is to say, returning to the flowchart of FIG. 5, if the average value AGYAVE of the lateral accelerations GY, which is calculated in the above-described procedure, is a predetermined value or more (YES in Step ST2-5), then the shift hold at the shift gear after the downshift is continued (Step ST2-4), and the processing is ended. Meanwhile, if the average value AGYAVE of the lateral accelerations GY is less than the predetermined value (NO), then a delay timer search is performed, and it is determined whether or not the delay timer has elapsed (Step ST2-6). If the delay timer has elapsed (YES) as a result of this, then the shift hold is continued (Step ST2-4), and the processing is ended. Meanwhile, if the delay timer has not elapsed (NO), then the shift hold is released (Step ST2-2), and the processing is ended.

Figure 7:
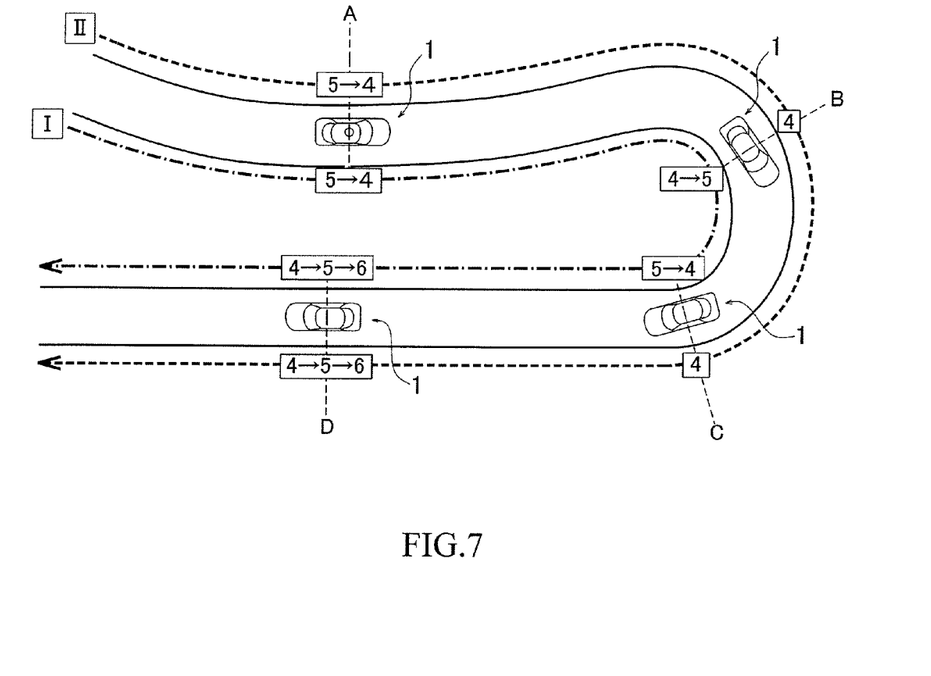
FIG. 7 is a view for explaining a specific example of running states of the vehicle and changes of shift gears in a case of performing a determination using the lateral acceleration in shift hold control and in a case of not performing the determination.

FIG. 7 is a view for explaining a specific example of running states of the vehicle 1 and changes of the shift gears in the case of performing the determination (Step ST2-5) using the above-described lateral accelerations GY in the shift hold control and in the case of not performing the determination at the running time in the sport running mode. Note that, in the case of not performing the determination (Step ST2-5) using the lateral accelerations GY in the shift hold control, the shift hold determination is performed by implementing only other steps than Step ST2-5 in the flowchart of FIG. 5. FIG. 7 shows the cases of running in the sport running mode on a meandering road (winding road) having a corner. Numbers on an arrow I shown by an alternate long and short dashed line are an example of shift gears in the case of not performing the shift hold determination using the lateral accelerations GY, and numbers on an arrow II shown by a dotted line are an example of shift gears in the case of performing the shift hold determination using the lateral accelerations GY.

As shown in FIG. 7, in the case of not performing the determination using the lateral accelerations GY in the shift hold control, then the downshift is performed from a fifth speed to a fourth speed by a paddle operation of the driver at a position A of a straight road before entering the corner. Thereafter, at a position B in a first half of the corner, the shift hold release (Step ST2-2) is performed based on the cruise determination (Step ST2-3), whereby the speed gears are upshifted from the fourth speed to the fifth speed. At a position C in a second half of the corner, a kickdown from the fifth speed to the fourth speed is generated by depression of the accelerator pedal by the driver. Then, at a position D on a straight road after escaping the corner, the accelerator pedal is returned, and cruise running is brought, whereby the speed gears are upshifted in order of the fourth speed, the fifth speed and the sixth speed.

Meanwhile, in the case of performing the determination using the lateral accelerations GY in the shift hold control, then as already mentioned, at the time when the vehicle runs at the position A, (1) the downshift vehicle speed VA, at which the downshift is implemented, is decided in response to the sport running estimated value and the down gradient. Then, (2) in the case where the deceleration $\Delta V$ of the vehicle 1 is the predetermined value $\Delta V1$ or more, and the brake switch is in the ON state, then the downshift is implemented at the above-described downshift vehicle speed VA. FIG. 7 shows a case where the downshift from the fifth speed to the fourth speed is implemented. Thereafter, at the position B in the first half of the corner, it is determined that the vehicle corners by the determination (Step ST2-5) using the lateral accelerations GY, whereby shift hold to the fourth speed gear is performed. Thereafter, also at the position C in the second half of the corner, it is determines that the vehicle still corners by the determination (Step ST2-5) using the lateral accelerations GY, the shift hold to the fourth speed gear is continued. Thereafter, at the position D on the straight road after escaping the corner, it is determined that the running road is a straight road by the determination (Step ST2-5) using the lateral accelerations GY, and moreover, it is determined that the vehicle is in the cruise state by the cruise determination (Step ST2-3), whereby the shift hold is released (Step ST2-4). In such a way, the speed gears are upshifted in order of the fourth speed, the fifth speed and the sixth speed.

As described above, in the control apparatus for a vehicle automatic transmission in this embodiment, in the event of calculating the downshift vehicle VA, the vehicle speed on the shift map is searched based on the sport running estimated value LEVELSP in addition to the estimated value DA of the vehicle gradient, whereby it is made possible to implement the early (that is, at a higher vehicle speed) downshift also on the flat road, and moreover, it is made possible to implement the early downshift also at the time other than the time of the sudden deceleration. Hence, the downshift can be implemented at appropriate timing matched with a request of the driver. Furthermore, after the implementation of the downshift, the average value AGYAVE of the lateral accelerations GY of the vehicle 1 is inserted into determination conditions for holding the current shift gear, whereby an unnecessary upshift can be suppressed, and it is made possible to ensure the responsiveness at the time of the re-acceleration.

[Second Embodiment]

Next, a description is made of a second embodiment of the present invention. Note that, in the description of the second embodiment and the drawings corresponding thereto, the same reference numerals are assigned to the same or equivalent constituent portions as or to those of the first embodiment, and a detailed description of the portions concerned is omitted below. Moreover, matters other than matters to be described below are the same as those of the first embodiment. This point also applies to other embodiments in a similar way.

Figure 8:
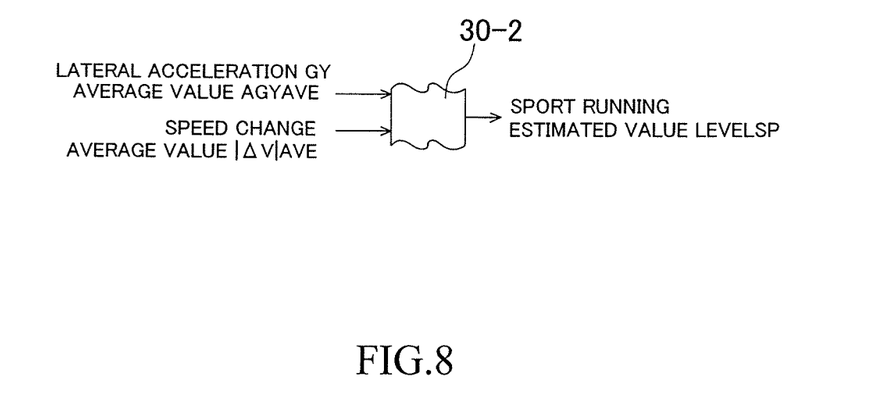
FIG. 8 is a conceptual view showing a calculation procedure of a sport running estimated value according to a second embodiment.

FIG. 8 is a conceptual view showing a calculation procedure of the sport running estimated value LEVELSP in the second embodiment. In the first embodiment, the sport running estimated value LEVELSP is calculated based on the average value $|\Delta TH|AVE$ of the accelerator pedal opening degree changes and on the average value $|\Delta V|AVE$ of the changes of the vehicle speed V, and meanwhile, in this embodiment, as shown in FIG. 8, the sport running estimated value LEVELSP is calculated based on the average value AGYAVE of the lateral accelerations GY of the vehicle 1 and on the average value $|\Delta V|AVE$ of the changes of the vehicle speed V. Hence, a map 30-2 of the sport running estimated value LEVELSP is a two-dimensional map, in which the average value ($|\Delta V|AVE$) of the changes of the vehicle speed V is taken on an axis of abscissas or an axis of ordinates, and the average value of the lateral accelerations GY is taken on the axis of ordinates or the axis of abscissas. Note that procedures of the downshift determination and shift hold determination of this embodiment are similar to those of the first embodiment except that a parameter for use in calculating the sport running estimated value LEVELSP is different from that of the first embodiment.

In this embodiment, the axis of ordinates of the map of the sport running estimated value LEVELSP is changed from the average value $|\Delta TH|AVE$ of the changes of the accelerator pedal opening degree (or the throttle opening degree) to the average degree AGYAVE of the lateral accelerations GY, whereby it is made possible to more appropriately sense the case where the vehicle 1 runs on the meandering road. Hence, it becomes possible to implement the downshift and the subsequent shift hold at more appropriate timing corresponding to a state of the road surface on which the vehicle 1 runs. In such a way, more appropriate downshift and shift hold determinations are enabled, which correspond not only to the operation amount of the accelerator pedal and the like by the driver but also to such a running environment as to whether the road surface on which the vehicle 1 runs is a straight road or a meandering road. Moreover, the sport running estimated value LEVELSP is calculated without using the average value $|\Delta TH|AVE$ of the accelerator pedal opening degree changes, whereby the shift hold can be prevented from being continued at inappropriate timing even in the case where the violent (rough) accelerator pedal operation (throttle operation) is made by the driver. Moreover, even in the drive by the driver highly skilled in driving, whose accelerator pedal operation (throttle operation) is gentle, in the case where the vehicle runs on the meandering road (winding road), the downshift can be generated at appropriate timing based on this fact, and the shift hold can be continued.

Figure 9A:
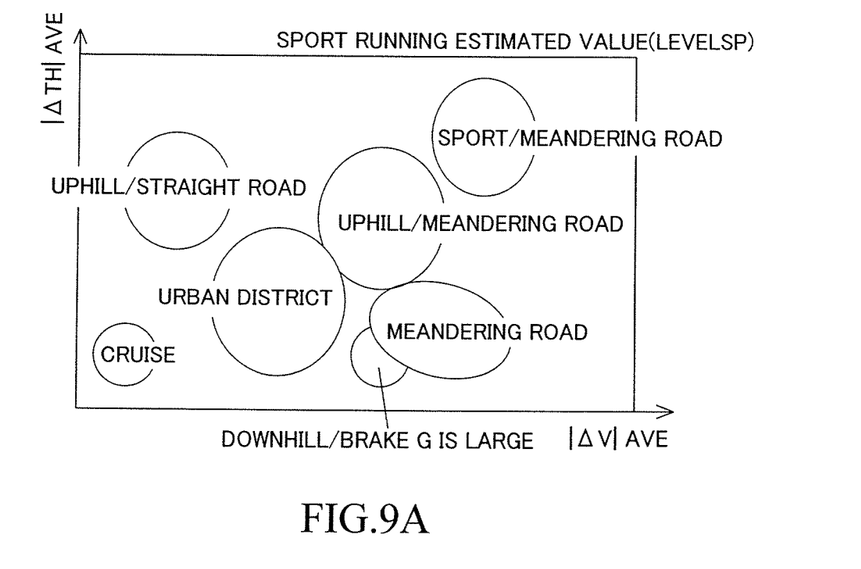
FIG. 9A is a chart showing a map of the sport running estimated values which are based on average values of opening degrees of an accelerator pedal.
Figure 9B:
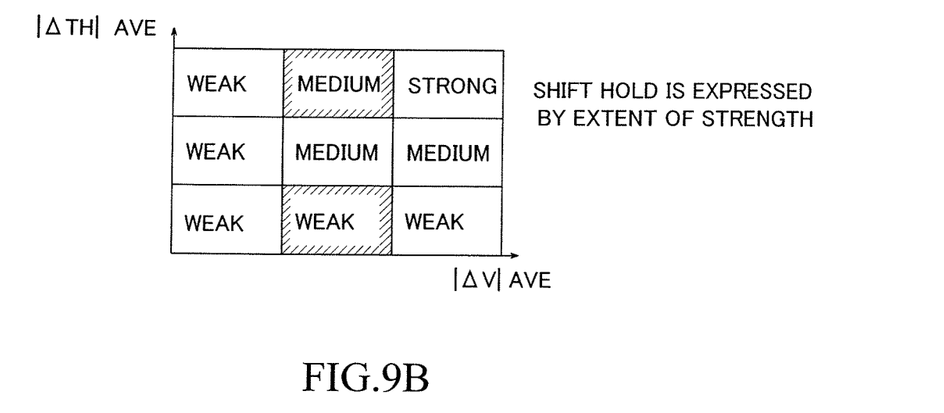
FIG. 9B is a diagram showing degrees of strength of shift hold at the respective positions on the map of FIG. 9A.
Figure 10A:
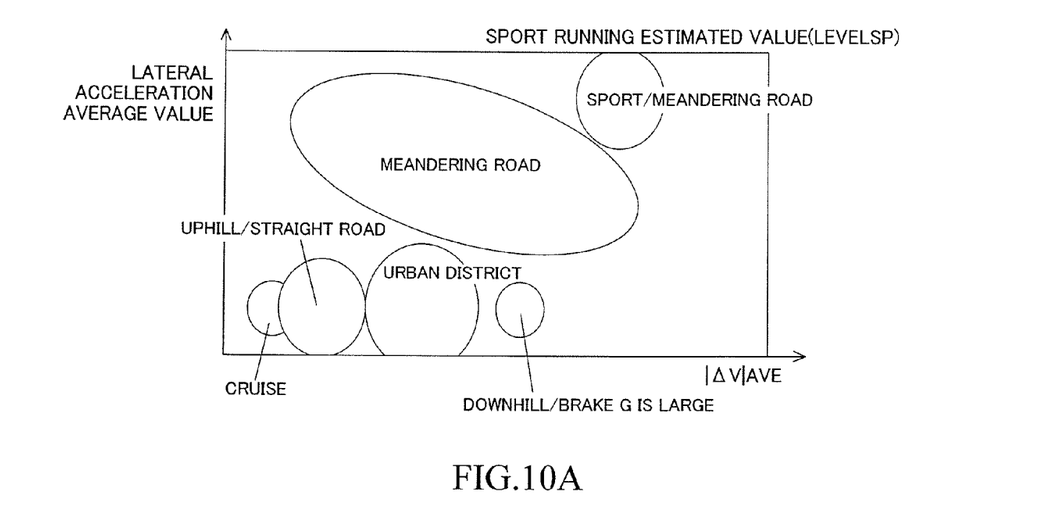
FIG. 10A is a chart showing a map of the sport running estimated values which are based on average values of the lateral accelerations.
Figure 10B:
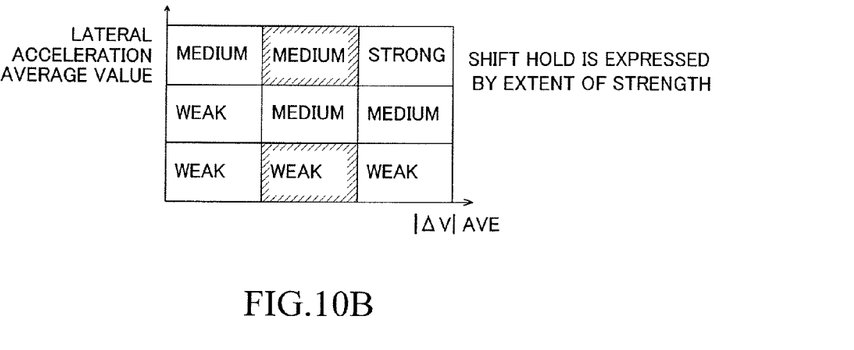
FIG. 10B is a diagram showing degrees of strength of the shift hold at the respective positions on the map of FIG. 10A.

Here, a description is made of comparison between the sport running estimated value LEVELSP, which is based on the average value $|\Delta TH|AVE$ of the accelerator pedal opening degree changes, and the sport running estimated value LEVELSP, which is based on the average value AGYAVE of the lateral accelerations GY. FIG. 9A is a chart showing a map of the sport running estimated values LEVELSP which are based on the average values $|\Delta TH|AVE$ of the accelerator pedal opening degree changes, and FIG. 9B is a diagram showing degrees of strength of the shift hold at the respective positions on the map of FIG. 9A. Moreover, FIG. 10A is a chart showing a map of the sport running estimated values LEVELSP which are based on the average values AGYAVE of the lateral accelerations GY, and FIG. 10B is a diagram showing degrees of strength of the shift hold at the respective positions on the map of FIG. 10A. Note that, on the maps of FIG. 9A and FIG. 10A, there are described distinctions (cruise, uphill/straight road, urban district, uphill/meandering road, downhill/brake, sport/meandering road, meandering road) of the running states or running roads of the vehicle 1, which correspond to the sport running estimated values LEVELSP on the maps concerned.

In shift hold control using the sport running estimated values LEVELSP which are based on the average values |ΔTH|AVE of the accelerator pedal opening degrees, as shown in the graph of FIG. 9A, a region where it is determined that the road surface on which the vehicle 1 runs is a meandering road is narrow, and accordingly, it is difficult to appropriately sense the running on the meandering road. Then, as shown in the graph of FIG. 9B, the strength of the shift hold is decided in response to the average values |ΔTH|AVE of the accelerator pedal opening degree changes. Accordingly, in the drive of the driver who performs the violent accelerator pedal operation, such an average value |ΔTH|AVE of the accelerator pedal opening degree changes is large, whereby an extent of the occurrence of the shift hold is strengthened. Meanwhile, in the drive of the driver who performs the gentle accelerator pedal operation, the average value |ΔTH|AVE of the accelerator pedal opening degree changes is small, whereby the extent of the occurrence of the shift hold is weakened.

As opposed to this, in shift hold control using the sport running estimated values LEVELSP which are based on the average values AGYAVE of the lateral accelerations GY of the vehicle 1, the region where it is determined that the road surface on which the vehicle 1 runs is a meandering road is wide, and accordingly, it is made possible to sense the running on the meandering road more appropriately. Then, as shown in the graph of FIG. 10B, the strength of the shift hold is decided in response to the average values AGYAVE of the lateral accelerations GY of the vehicle 1. Accordingly, in the case where the vehicle 1 runs on the meandering road, such an average value AGYAVE of the lateral accelerations G is large, whereby the extent of the occurrence of the shift hold is strengthened. Meanwhile, in the case where the vehicle 1 runs on the straight road, the average value AGYAVE of the lateral accelerations GY is small, whereby the extent of the occurrence of the shift hold is weakened. In such a way, it becomes possible to set an appropriate shift hold region corresponding to the running environment of the vehicle 1 irrespective of the operation manner of the driver.

The description has been made above of the embodiments of the present invention; however, the present invention is not limited to the above-described embodiments, and is modifiable in various ways within the scope of claims and the scope of the technical idea described in the specification and the drawings.

The invention claimed is:

1. A control apparatus for a vehicle automatic transmission, which performs upshift and downshift control for speed gears in accordance with a shift map including upshift and downshift lines set for each of the speed gears, the control apparatus comprising:
  shift mode switching means for executing, in a switching manner, an automatic shift mode of automatically performing a shift operation by determining a speed gear based on a running state of a vehicle, the speed gear being to be set, and a manual shift mode of performing a shift operation instructed by a manual operation of a driver;
  downshift determining means for performing a determination as to whether or not to implement an automatic downshift of the speed gear in the manual shift mode;
  brake detecting means for detecting an actuation of a brake;
  deceleration calculating means for calculating deceleration of the vehicle;
  vehicle speed detecting means for detecting a vehicle speed;
  running state estimated value calculating means for calculating a running state estimated value obtained by searching a value on a map prepared in advance based on an average value of amounts of accelerator pedal operations by the driver and on an average value of changes of the vehicle speed; and
  downshift vehicle speed calculating means for calculating a downshift vehicle speed by searching a vehicle speed on the shift map based on the running state estimated value and on an estimated value of a vehicle gradient,
  wherein the downshift determining means determines implementation of the downshift in a case where the actuation of the brake is detected by the brake detecting means, in a case where the deceleration of the vehicle, the deceleration being calculated by the deceleration calculating means, is a predetermined value or more, and in a case where a current vehicle speed detected by the vehicle speed detecting means is the downshift vehicle speed or more.

2. The control apparatus for a vehicle automatic transmission according to claim 1, further comprising:
  shift hold determining means for performing a determination as to whether or not to hold a current shift gear,
  wherein the shift hold determining means performs a shift hold determination as to whether or not to hold the current shift gear after the implementation of the downshift, and
  the shift hold determination is performed based on whether or not an average value of the lateral accelerations of the vehicle is a predetermined value or more.

3. The control apparatus for a vehicle automatic transmission according to claim 2, further comprising:
  running mode switching means for executing, in a switching manner, a normal running mode of performing shift control that is based on a normal shift map, and a sport running mode of performing shift control that is based on a shift map for sport running,
  wherein the determination of the downshift by the downshift determining means and the determination of the shift hold by the shift hold determining means are performed at a time when the sport running mode is implemented.

4. The control apparatus for a vehicle automatic transmission according to claim 1, further comprising:
  running mode switching means for executing, in a switching manner, a normal running mode of performing shift control that is based on a normal shift map, and a sport running mode of performing shift control that is based on a shift map for sport running,
  wherein the determination of the downshift by the downshift determining means and the determination of the shift hold by the shift hold determining means are performed at a time when the sport running mode is implemented.

5. A control apparatus for a vehicle automatic transmission, which performs upshift and downshift speed control for speed gears in accordance with a shift map including upshift and downshift lines set for each of the speed gears, the control apparatus comprising:
  shift mode switching means for executing, in a switching manner, an automatic shift mode of automatically performing a shift operation by determining a speed gear based on a running state of a vehicle, the speed gear being to be set, and a manual shift mode of performing a shift operation instructed by a manual operation of a driver;

downshift determining means for performing a determination as to whether or not to implement an automatic downshift of the speed gear in the manual shift mode;

brake detecting means for detecting an actuation of a brake;

deceleration calculating means for calculating deceleration of the vehicle;

vehicle speed detecting means for detecting a vehicle speed;

running state estimated value calculating means for calculating a running state estimated value obtained by searching a value on a map prepared in advance based on an average value of lateral accelerations of the vehicle and on an average value of changes of the vehicle speed; and downshift vehicle speed calculating means for calculating a downshift vehicle speed by searching a vehicle speed on the shift map based on the running state estimated value and on an estimated value of a vehicle gradient, wherein the downshift determining means determines implementation of the downshift in a case where the actuation of the brake is detected by the brake detecting means, in a case where the deceleration of the vehicle, the deceleration being calculated by the deceleration calculating means, is a predetermined value or more, and in a case where a current vehicle speed detected by the vehicle speed detecting means is the downshift vehicle speed or more.

6. The control apparatus for a vehicle automatic transmission according to claim 5, further comprising:

shift hold determining means for performing a determination as to whether or not to hold a current shift gear, wherein the shift hold determining means performs a shift hold determination as to whether or not to hold the current shift gear after the implementation of the downshift, and the shift hold determination is performed based on whether or not an average value of the lateral accelerations of the vehicle is a predetermined value or more.

7. The control apparatus for a vehicle automatic transmission according to claim 6, further comprising:

running mode switching means for executing, in a switching manner, a normal running mode of performing shift control that is based on a normal shift map, and a sport running mode of performing shift control that is based on a shift map for sport running, wherein the determination of the downshift by the downshift determining means and the determination of the shift hold by the shift hold determining means are performed at a time when the sport running mode is implemented.

8. The control apparatus for a vehicle automatic transmission according to claim 5, further comprising:

running mode switching means for executing, in a switching manner, a normal running mode of performing shift control that is based on a normal shift map, and a sport running mode of performing shift control that is based on a shift map for sport running, wherein the determination of the downshift by the downshift determining means and the determination of the shift hold by the shift hold determining means are performed at a time when the sport running mode is implemented, shift hold determining means for performing a determination as to whether or not to hold a current shift gear, wherein the shift hold determining means performs a shift hold determination as to whether or not to hold the current shift gear after the implementation of the downshift, and the shift hold determination is performed based on whether or not an average value of the lateral accelerations of the vehicle is a predetermined value or more.

* * * * *